UNITED STATES PATENT OFFICE.

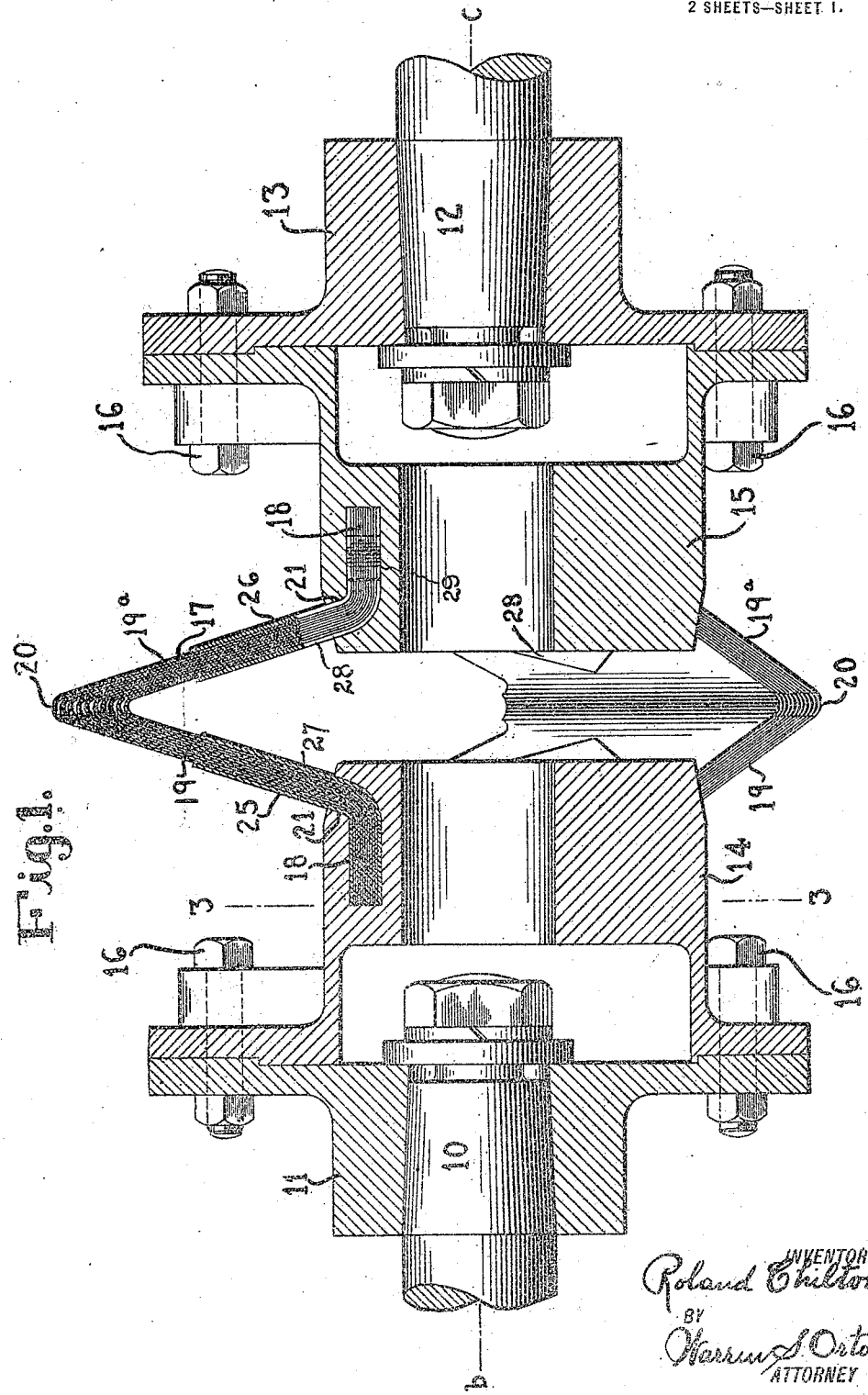

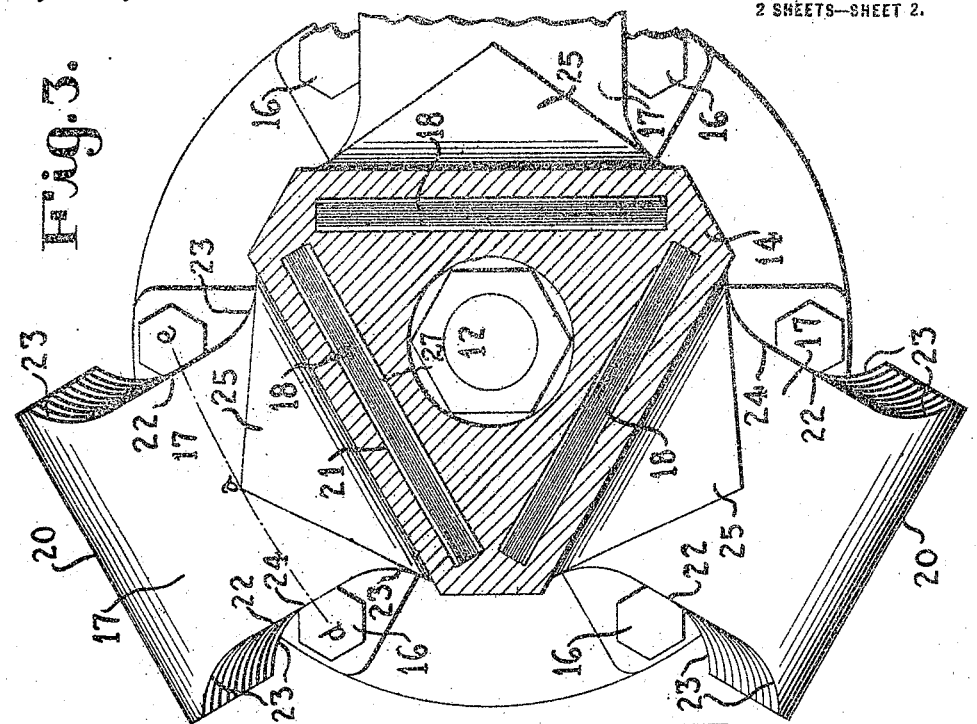
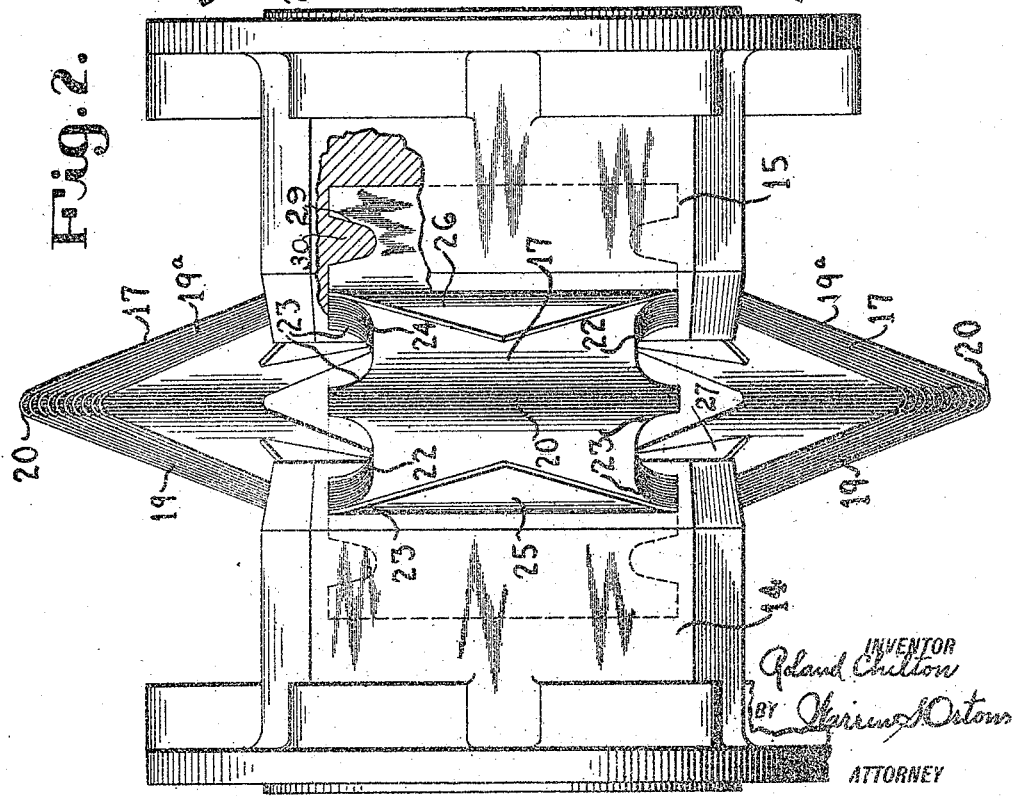

ROLAND CHILTON, OF KEYPORT, NEW JERSEY.

UNIVERSAL JOINT.

1,379,962.  Specification of Letters Patent.  Patented May 31, 1921.

Application filed May 28, 1920. Serial No. 384,851.

*To all whom it may concern:*

Be it known that I, ROLAND CHILTON, subject of the King of England, resident of Keyport, in the county of Monmouth and State of New Jersey, have invented certain new and useful Improvements in Universal Joints, of which the following is a specification.

The invention relates in general to an improvement in flexible driving couplings for installation between a driving and driven member in situations where permissible relative movement of the members in certain directions is desired while maintaining fixedness of relative position considered circumferentially of the mean axis of rotation of the driving and driven members, and specifically the invention relates to an improvement in flexible couplings of the type disclosed in my copending application, Serial No. 289,358, filed April 11, 1919.

The previous disclosure was characterized by a coupling which included hub members, each mounted for rotary movement about its own axis and connected by a laminated spring structure, each lamina of which includes straight, alined, end portions connected to the driving and driven hub members and intermediate V-shaped portions connecting the end portions and extending radially outward from the common axis of rotation.

It is appreciated that in devices of the type disclosed, it is necessary, in order to obtain the requisite transmission of rotary torque with the least amount of metal, that the metal be distributed with its greatest cross-sectional dimension extending tangent, or substantially tangent, to the circle of rotation of the driving and driven elements defining opposite ends of the coupling. This requirement necessitates the use of spring plate structures which, as disclosed in the prior application, adequately responds to the requirement in such structures of efficient rotary torque transmitting characteristics.

If a joint with straight sided plates such as is disclosed in the prior application be rotated under angular deflection, the leaves constituting the spring structure will tend ultimately to fail due to fatigue fractures. With these parallel sided leaves the line of break will occur first at the root of the springs, that is where they join the hub members and then at the crown, that is at the line of juncture between the two leaf elements.

One of the objects of the present disclosure is to retain, as far as is economically possible, all of the advantages relative to capacity to transmit efficiently rotary torque characterizing the prior disclosure, that is to feature torsional rigidity, and to increase the factor of safe flexibility over the showing in the device in the previous disclosure, that is to feature angular flexibility without tendency to fractures.

In so far as the features of flexibility under angular distortion is concerned, I attain the invention by providing a spring coupling member which will tend to possess a uniform degree of deflection throughout its length or, more exactly, to attain circular deflection.

Considering from the technical standpoint, each lamina of the structure herein illustrated constitutes a special case of a beam or flat spring fixed to its abutment at either end, the spring being bent at its center in this special case. According to the general principles of such springs, points of maximum bending movement occur at the center and at each end, which are accordingly points of weakness in beams of uniform cross-section being the points where maximum bending and stress are concentrated, and where, accordingly, fatigue fractures limit the degree of safe deflection. Such beams are accordingly made of maximum section at the ends and at the center, and in the case of beams of uniform thickness, uniform deflection, *i. e.*, "circular deflection" is achieved by giving the beam a profile of four triangles, having their bases at the center and ends, (corresponding crowns and roots of the springs of this disclosure). The apices of the triangles abut at the center of each half of the beam which are points of no stress and therefore of no curvature under deflection in beams of parallel section. A fixed end beam of the quadruple triangular profile discussed has uniform deflection throughout its length, and accordingly avoids the concentration at the center and ends which would cause localized stress and fatigue fractures at relatively small deflection in a parallel sided spring. Points of zero section, however, are not permissible in a structure which is subject to shear loads or edgewise bending.

Accordingly one of the objects of the invention is to provide a structure of the class described, which will approximate the theoretical triangular profile toward the roots and crowns of the leaves while departing from this ideal form to provide a substantial width between these points of maximum bend thereby to obtain the edgewise strength necessary to transmit rotary torque or pressure.

In order further to feature the triangular profile necessary to attain circular deflection there is disclosed as part of the laminated driving structure additional stub leaves positioned at the roots of the spring structure and which can have the theoretical triangular profile and will restrain the driving structure to the theoretical circular deflection.

Considering the torque transmitting capacity of the joint, it will be obvious that each radially extending plate constitutes a cantaliver which would be subject to pure edgewise loading if the crowns of the leaves could be made of theoretically sharp V form. Constructional limitations make it difficult to achieve this, but it is desirable to reduce the radius of curvature at the crown, or point of juncture of the two leaf elements to a minimum.

Accordingly, another object of this invention is to provide a crown edge to the conjunction of the cantaliver side plates of the V-spring structure which is rounded with the smallest possible diameter of curvature but whose radius is not sharper than the ductility of the metal will permit.

In structures of the type discussed the frequent and sometimes rapid bending of the spring plate at its juncture with the end elements or hub members develops an additional and frequently severe local bending which seriously impairs the durability of the structure.

It is well known that in a structure subject to rapid flexure, sudden changes of section cause localization of stress and bending and accordingly invite fatigue fractures.

Accordingly, another object of the invention is to provide a reinforcing means for minimizing the destructive effect of local bendings at the connection of the spring structure with its attached elements. This object is attained by the positioning of the redundant plates in the angle formed by the hub inclosed end portion and the laterally extending V-shaped portion of the spring structure as previously suggested in reference to building up the triangular profile.

In the laminated form of spring structure featured in this disclosure, this reinforcement at the roots of the spring structures is effectively attained by cutting back the outer lamina from the crown edge of the V-shaped extension and in this way forms the redundant or stub leaves.

In practice it is found that the change in angle between the axis of rotation of the end members causes the laminæ on the acute side of the angle to crowd together and accordingly the invention contemplates a spring structure in which the laminæ are initially set in slightly spaced apart position to minimize resistance to the angular change.

The rigid attachment of the ends of an assemblage of laminated springs to a driving member is a matter of some constructional difficulty if carried out by the common method of bolts or other clamping devices. Great accuracy of construction is called for to insure exact correspondence of fit between the spring ends and the fixing members in order to avoid local or initial stress and distortion in clamping or bolting up, which must be carried out with great rigidity to avoid the possibility of the springs moving in their fixings under driving loads. Such accuracy is difficult to obtain in manufacturing and in the specific type of spring shown, as the bends at the roots of the springs are conveniently made by bending the assemblage of lamina all together wherefrom it follows that each lamina has a different radius of curvature from its neighbor, and that any bolt or dowel holes or other fixing means must be located at a different distance from the bend in each leaf in order that all such holes shall aline perfectly.

Accordingly, another object of the invention is to provide a simple construction for holding the laminæ of the plate structure rigidly in prefixed position. This is most conveniently attained by casting the hubs onto the assembled plates.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is an axial sectional view taken through a preferred embodiment of the invention and showing the same in operative engagement with a driving and driven shaft, shown in normal position, and with one end of the upper spring structure shown in side elevation. The showing is specifically identified as a flexible coupling in a power transmission shaft, such as is found in the power plant of an automobile;

Fig. 2 is a plan view looking down on the structure shown in Fig. 1 with parts broken away to show the interlocking of the spring structure in the hubs; and Fig. 3 is a transverse sectional view taken on the line 3—3 of Fig. 1.

In the following description and in the claims, parts will be identified by specific names for convenience of expression but they are intended to be as generic in their application to similar parts as the art will permit.

In the drawings there is shown a driving shaft 10, provided with an attaching face plate 11, and a driven shaft 12 provided with a similar plate 13, between which plates 11 and 13 is positioned a unitary, preformed structure in the form of a power transmitting coupling illustrating a preferred embodiment of the invention. This coupling includes massive end hub members 14 and 15 attached respectively to the plates 11 and 13 by means of the usual fastening through bolts 16. This plate connecting construction is illustrated because the transmission shafts of automobile structures now in general use are provided with the plates 11 and 13, but it is preferable, on the ground of economy in construction and use of material, that the hub members 14 and 15 be of no greater diameter than is necessary to contain the ends of the spring plate structures 17

These spring plate structures are shown to be three in number and disposed 120° apart about the common and normal axis of rotation indicated by the line $b-c$ in Fig. 1, but it is understood that there is nothing peculiar in the selection of the three spring structure, except that in most situations a balanced spring structure about the common axis of rotation is preferable but not necessary.

As the organization of each of these spring plate structures is similar, the description of any one will be sufficient for the others. Each structure is made up of a plurality of thin wide sheets of spring metal, V-shaped in side elevation as particularly shown on the upper part of Fig. 1, rested one on the other or rather with a very slight space between each lamina to provide a laminated structure preferably in which the laminæ or rather the middle portion of the laminæ is capable of very slight relative movement. Opposite ends of the laminated structure are in the form of out-turned and parallel end portions 18 which have their greatest cross-sectional width extending tangent to the circle of rotation, as shown in Fig. 3. The end portions of the laminated structures are securely held together in this position and fixed against relative movement. This securing of the thin sheets defining the ends of the structures is most readily attained by casting the hub members onto the ends thereby to securely anchor the same in position free of initial loads. One means for effecting this locating of the spring plates relative to each other is more fully disclosed in my copending application, Serial No. 397,790, filed July 20, 1920, on method and apparatus for assembling spring coupling structures.

The middle portion of the spring structure, as shown in Fig. 1 extends radially outward from the common axis of rotation $b-c$ to form a V-shaped extension. This V-shaped extension includes, in each laminæ, opposite sides 19 and 19$^a$ meeting at the angle of the V to form a relatively sharp crown edge 20. Each side coacts with its contiguous end 18 to form a base edge 21 at its respective hub member. The structure as thus far described corresponds, in a general way, to the disclosure in my prior application, Serial No. 289,358.

One of the features of novelty in the present disclosure relates to the cut-away portion of the sides 19 and 19$^a$ of each of the laminated structures. The middle portion of these sides considered circumferentially of the circle of rotation (see Fig. 3) is of less width considered along the line $d-a-e$ than the length of either of the edges 20 or 21. Opposite ends of the edges 22 of each of the sides are slightly curved as shown at 23 and tend to correspond generally to the opposite sides of the theoretical triangle previously discussed. The connecting middle portion 24 of each edge is substantially straight and connects the flattened out portions of the sides of the triangles or rather the flat curves 23 at opposite ends.

The ideal construction considered mathematically would necessitate the formation of the crown edge 20 as a sharp angle and in this disclosure the angle will be so regarded. However, it is obvious that such a structure when made of metal is practically impossible and in order to attain the sharp edge as far as practicable it is to be considered that the edge 20 is bent about a circular form, the diameter of which is as small as can be made, taking into consideration the ductility of the particular metal used. As the plates are made of thin metal and the crown edges of the succeeding laminæ are spaced apart as shown in Figs. 1 and 2, an unusually sharp edge can be attained and at the same time be capable of responding readily both to the transmission of rotary torque and to the rapid changing of angles between the sides 19 and 19ª, when the hubs are rotating at high speeds about different axes.

In structures of the type disclosed, it is apparent that there is a sharp bending along the edges 21 which tend to crack the spring plates along the line of this edge. In order to minimize, if not entirely eliminate local bending at this point, and at the same time provide a structure which will tend to assume, at least in so far as the ends are concerned, the ideal four-triangle beam structure, the outermost laminæ is cut back from the crown edge 20 to form a pair of redundant plates 25 and 26 on opposite sides of each laminated plate structure. These plates fit in the angle formed by each side and its adjacent end portion 18. This structure causes the outermost V-forming lamina and successively each lamina thereneath to bend about the outer plate during the relative angular movement of the axis of the hub members.

In order to further feature the relatively great depth of section at the roots of the structure required by the theoretical beam structure discussed, the redundant plates are preferably made of thicker material than the driving laminæ and may be of the triangular form in plan shown in Fig. 3.

In a further effort to build up the plate structure at its roots, and thus tend toward circular deflection of the structure as a whole under distorting strains, additional thick redundant plates 27 and 28 constitute the innermost laminæ of each structure. It is obviously within the scope of this disclosure to multiply the number of redundant plates used. In order to secure the end portions 18 in the hub member against any possible edgewise movement opposite edges of the end portions are provided with recesses 29 into which the material of the hubs flow during the process of casting the hubs to form locking fingers 30.

In operation and assuming the simplest conditions when the axis of rotation of the driving and driven members coincide as shown in Fig. 1 rotary torque imposed on the system by the driving shaft will simply act edgewise of the spring structures as shown in Fig. 3 and transmit the torque effort to the driven member. With sharply defined crown edges the usual twisting deformation is largely eliminated and torsional rigidity is attained.

Under angular deflection each side of the V-shaped extension will tend to assume a slight S-shaped form in cross-section, and the structure disclosed with its approach to the four triangle profile will tend toward circular deflection and thus tend to make this S-form of uniform curvature from end to end and free of local bends.

By means of a device of this character there is retained all of the advantages relative to rotary rigidity inherent in the structures disclosed in my previous application and at the same time there is an elimination of breakage which would otherwise occur when sudden changes of section are subjected to shock.

As the structure is designed, in so far as is physically possible, on the plan of a beam possessing circular deflection, the maximum possible angular flexibility is attained and breaks are reduced to a minimum.

The casting of the hub members directly onto the relatively long ends of the spring structure acts to securely anchor the lamina in its prefixed position, eliminates the possibility of the lamina becoming loosened from the driving or driven member under conditions of severe use, and provides a structure free of initial loads.

The presence of the redundant plates act to eliminate local bending at the place where such an action is most likely to occur with the result that tendencies to crack under excessive strain, metal fatigue are minimized. The device is characterized by an extremely high efficiency for it has practically one hundred per cent. efficiency under the small angular changes of axes to which such devices are subjected when constituting part of an automobile power system.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. An elastic shaft coupling comprising two coupling members, each mounted for rotary movement about an axis extending substantially in the same general direction, and spring plate structures connecting the coupling members, said structures each having end portions extending substantially tangent to the circle of rotation of the attached members and including flat sides coacting to form approximately V-shaped spring extensions connecting the end portions of said structures, each of said flat sides being connected along one base edge with the contiguous coupling member and connected along the opposite edge with each other to form the crown edge at the angle of the V, said flat sides being reduced in width circumferentially of the circle of rotation between said connected edges thereby to feature circular deflection while maintaining capacity to transmit rotary motion from one coupling member to the other.

2. In a device of the class described, the combination of a driving and driven member each mounted for rotary movement about its respective axes, flexible means supplementing each other for connecting the driving and driven members, said means including a spring plate structure with the plates each having its greatest cross-sectional width extending substantially in the direction of rotation of one of said members and having less width circumferentially of said direction of rotation at its middle width than at the base edges adjacent the driving and driven members.

3. In a device of the class described, the combination of a driven and driving element mounted for rotary movement, a flexible connection therebetween including a spring plate with its middle portion projecting radially relative to said axis of rotation, to form a double cantaliver extension, the mid-portions of the sides of the V being of less width, considered in the direction tangent to the circle of rotation, than the width of the sides measured adjacent its connection with said elements.

4. In a device of the class described, the combination of a driven and driving element mounted for rotary movement, a flexible connection therebetween including a spring plate with its middle portion projecting radially relative to said axis of rotation, to form a double cantaliver extension, the edge of the plate forming one side of the cantaliver extension being recessed inwardly from a point adjacent the connection of said extension with the adjacent element to form a curve.

5. In a device of the class described, the combination of a driven and driving element mounted for rotary movement, a flexible connection therebetween including a spring plate with its middle portion projecting radially relative to said axis of rotation to form a double contaliver extension, the edge of the plate forming one side of the cantaliver extension being recessed inwardly from a point adjacent the connection of said extension with the adjacent element.

6. In an elastic shaft coupling, the combination of a spring plate member V-shaped in section and end portions extending outwardly from opposite ends of the V and cast-on hubs secured to said end portions and constituting power members each rigidly connected to the spring member.

7. In an elastic shaft coupling, the combination of a spring plate member V-shaped in section and end portions extending outwardly from opposite ends of the V. cast-on hubs secured to said end portions and constituting power members each rigidly connected to the spring member, and means for reinforcing the connection of the hubs with the adjacent side of the spring plate member, said means being positioned in the angles between the hubs and the said adjacent sides.

8. In an elastic shaft coupling, two hubs and a plate spring structure connecting the hubs, said structure including flat plates with their end portions secured to said hubs and approximately V-shaped portions connecting the end portions and extending therefrom radially of the axis of rotation of the hubs, and a redundant leaf fitted in the angle between one of the end portions and the adjacent side of the radially extending V-shaped portion adapted to avoid local bending at the anchorage of the spring structure with the contiguous hub.

9. In an elastic shaft coupling, two hubs and a laminated plate spring structure connecting the hubs, said structure including flat plates with their end portions extending tangent to the circle of rotation of the hubs and secured to said hubs and approximately V-shaped portions connecting the end portions and extending therefrom radially of the axis of rotation of the hubs, two plates constituting an additional lamina of said laminated structure, forming two redundant plates at the conjunction of the V-shaped portion and the end portions and adapted to avoid local bending at the angles.

10. In a device of the class described, the combination of a hub member mounted for rotary movement about an axis of rotation, a flat plate spring member secured to said hub member and having a part extending therefrom radially of said axis and a redundant spring plate projecting from the hub and disposed in the angle formed by the hub and said extending part adapted to avoid local bending at said angle.

11. In a device of the class described, the combination of a hub member mounted for rotary movement about an axis of rotation, a flat plate spring member having one end secured to said hub member and a continuation of said end extending radially from said axis of rotation, and means for minimizing sharp bending of the spring member at its connection with the hub member.

12. In a power transmission device, a laminated spring structure including a plurality of laminæ nested one on the other, each lamina including straight end portions and a connecting V-shaped middle portion, the lamina on one side of the nest being intercepted at the angle of the V to form two redundant plates extending across the angles formed by the end portions and the adjacent middle portion and means engaging the end portions for securing the lamina in position.

13. In a power transmission device, a laminated spring structure including a plurality of laminæ nested one on the other, each lamina including straight end portions and a connecting V-shaped middle portion, the outermost lamina on one side of the nest being intercepted at the angle of the V to form two redundant plates extending across the angles formed by the end portions and the adjacent middle portion and cast-on members engaging said end portions for securing the lamina in position.

14. A power transmission coupling including a spring plate having an end portion mounted for rotary movement about an axis of rotation and a V-shaped portion constituting a continuation of the end portion and extending radially of the axis of rotation, said V-shaped portion formed of flat sides connected along a common rounded crown edge, characterized by a curvature, the diameter of which is small thereby to form a relatively sharp edge but which curvature is not less than the curvature permitted by the ductility of the metal.

15. A power transmission coupling including a spring plate having an end portion mounted for rotary movement about an axis of rotation and a V-shaped portion constituting a continuation of the end portions and extending radially of the axis of rotation, the V-shaped portion formed of flat sides connected integrally along a common sharp crown edge.

16. A power transmission coupling including a spring structure having end members each designed to rotate about its respective axes of rotation and a V-shaped part connecting the end members and extending in a general lateral direction from the axes of rotation, said V-shaped extension having its material disposed to simulate a beam having circular deflection.

17. A power transmission coupling including a spring structure having end members each designed to rotate about its respective axes of rotation and a V-shaped part connecting the end members and extending in a general lateral direction from the axes of rotation, said extension having a greater cross-sectional area of material at the jointure of the extension with each of the end members than at other points between the jointures.

18. A power transmission coupling including a spring plate having an end portion mounted for rotary movement about an axis of rotation and a V-shaped portion constituting a continuation of the end portion and extending radially of the axis of rotation, the V-shaped portion formed of flat sides connected integrally along a common sharp crown edge, the extension having a greater cross-sectional area of material at the crown edge than at a point intermediate the crown edge and the end portion.

19. A power transmission coupling including a spring structure having end members each designed to rotate about its respective axes of rotation and a V-shaped part connecting the end members and extending in a general lateral direction from the axes of rotation, said V-shaped extension having a greater cross-sectional area of material adjacent the end members and at the angle of the V than at points intermediate the angle and the end members.

20. A power transmission coupling including a spring structure having end members each designed to rotate about its respective axes of rotation and a V-shaped part connecting the end members and extending in a general lateral direction from the axes of rotation, said V-shaped extension having two points of minimum cross section disposed between three points of maximum cross-section.

21. In a device of the class described, the combination of a single spring member including spaced end parts, each designed to rotate about its respective axis and an intermediate part extending laterally of the axis of rotation, and means associated with said member for minimizing sharp bending of the same when said end members are moved angularly relative to each other.

22. In an elastic shaft coupling, the combination of a spring member including an end member and a V-shaped extension integral therewith, said extension having variable cross-sectional areas with the maximum cross-sectional area adjacent the connection thereof with the end member and a hub member containing the end member and the juncture of the end member with the extension.

23. In an elastic shaft coupling, the combination of a spring member including an end member and a V-shaped extension integral therewith, said extension having variable cross-sectional areas with the maximum cross-sectional area adjacent the connection thereof with the end member and a hub member containing the end member and the juncture of the end member with the extension, said hub and end member provided with means coacting to defeat any tendency of relative movement between the hub member and the end member.

24. In an elastic shaft coupling the combination of a spring member consisting of a plurality of laminations having end members and a connecting V-shaped part extending laterally from the end members with the mid-portions thereof extending to the outside of the projected outlines of the end members, and hub members inclosing the end members, and acting thereon to prevent relative movement between the hub member and the laminations of its contained end member.

25. In a device of the class described, the combination of two spaced castings constituting hub members and a connecting V-shaped spring member having its opposite ends let into the castings and secured therein in the act of forming the castings.

Signed at Keyport in the county of Monmouth and State of New Jersey this twenty-second day of May A. D. 1920.

ROLAND CHILTON.